April 25, 1961     L. PÉRAS     2,981,121
AUTOMATIC CONTROL DEVICES FOR CHANGE-SPEED GEARS
Filed Aug. 4, 1958     2 Sheets-Sheet 1
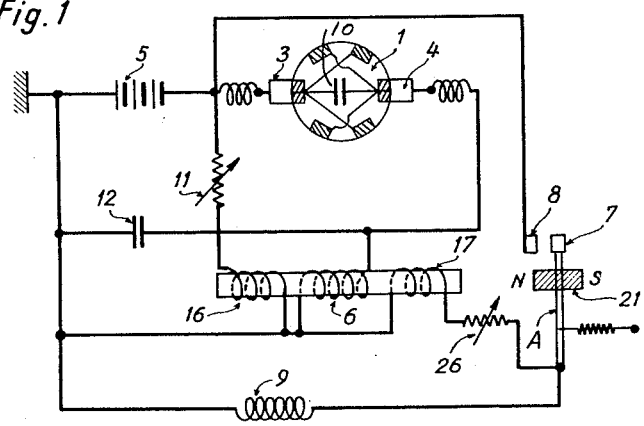
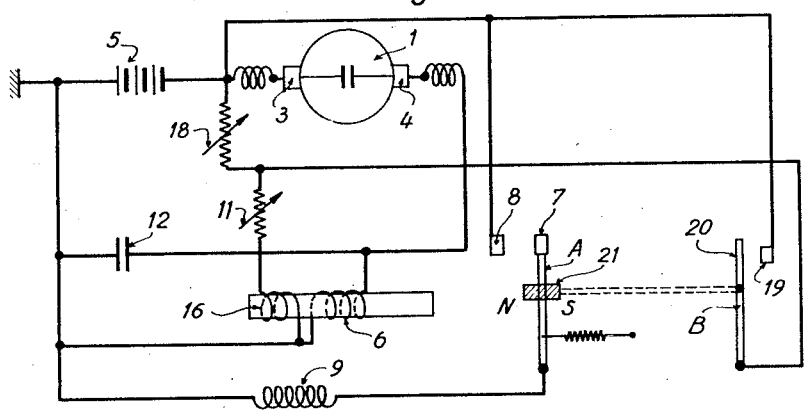
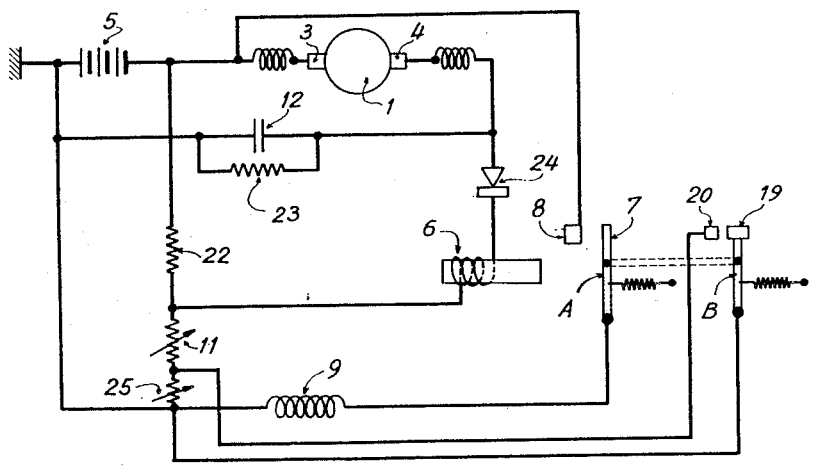

United States Patent Office 2,981,121
Patented Apr. 25, 1961

2,981,121

AUTOMATIC CONTROL DEVICES FOR CHANGE-SPEED GEARS

Lucien Péras, Billancourt, France, assignor to Regie Nationale des Usines Renault, Billancourt, France Filed Aug. 4, 1958, Ser. No. 752,945

Claims priority, application France Aug. 22, 1957

11 Claims. (Cl. 74—365)

This invention relates to improvements in automatic control devices for change-speed gearboxes, which are applicable more particularly to automobiles, as described and illustrated in U.S. Patents No. 2,927,474 issued March 8, 1960, and No. 2,910,884 issued November 3, 1959.

In these prior specifications an automatic control device for change speed gear is described wherein a pulsating current having an average value proportional to the speed of rotation of a shaft—this current being possibly modulated as a function of another parameter consisting in principle of the load fraction of the engine—actuates a relay controlling in turn the engagement or disengagement of a predetermined transmission gear ratio.

This invention is concerned with other embodiments of this invention for the purpose of providing an increased safety, responsiveness and stability of operation of the relay in combination with the automatic control device already described and illustrated in my patents aforesaid, the stability of operation being measured by determining the ratio of the current causing the relay to close to the current required for opening this relay.

These various forms of embodiment will be described hereafter with reference to Figs. 1, 2 and 3 of the attached drawings which are schematic circuit diagrams and form part of this specification.

It should be noted that in the following description those parts which are common to the various embodiments of the invention and improvements have been given the same reference numerals. Moreover, it will likewise be understood that the present invention is described with respect to an automatic control device for gear boxes (not shown) in vehicles in which the change of one gear ratio to another is effected as the function of the speed of an output shaft (not shown) of the gear box.

Other objects and a more complete understanding of the invention may be had by referring to the following description and claims, taken with the accompanying drawings in which:

Figs. 1 to 3 are schematic circuit diagrams illustrating three embodiments of the invention.

Figure 4:
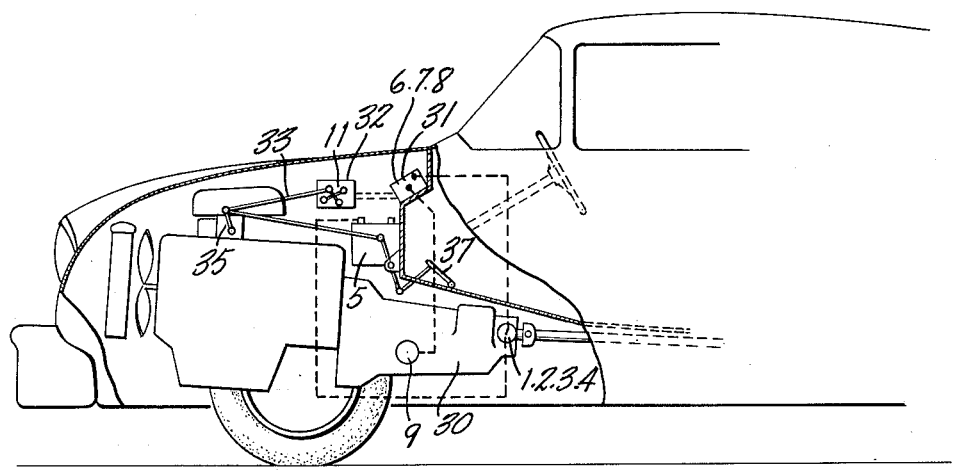
Fig. 4 is a perspective view illustrative of an overall arrangement of the present invention in a vehicle.

In Figure 1, it is found a storage battery 5, a rotary commutator 1 and brushes 3 and 4 associated therewith for causing a pulse current to flow through a main winding 6 of a relay, this current having the pulses damped by a capacitor 12 and having an average value proportional to the velocity of rotation of a shaft on which the commutator 1 is keyed. A winding 16 of the same relay is fed from the storage battery through a variable resistor 11 for introducing the engine load parameter; this winding 16 is energized in the reverse direction with respect to the former and its action is deducted from that of the winding 6. A relay armature A is adapted, through contacts 7, 8, to connect the battery 5 to a winding 9 of the apparatus (not shown), for example in electromagnetic clutch, by which the desired gear ratio is engaged.

Means for producing the flow of pulsating current comprises a capacitor 10 made fast to the rotor 1 which has the form of a commutator having an equal number of bars (six in the case of Figure 1). The rotor 1 is driven by an output shaft (not shown) of a gear box 30 whose speed variations are to influence the system. The brush 3 is connected to the electrical source 5, and the brush 4 is connected to the relay 6. The dimensions and number of commutator bars, the dead spaces separating them, and the angle which the brushes 3 an 4 form between them, are such that the cycles of charging and discharging the capacitor succeed one another without it being possible for the current to pass directly between the brushes. The two sides of the capacitor 10 are connected respectively to two series of alternate bars. The bars are separated by non-conductive spaces. These nonconductive spaces and the width of the brushes are so dimensioned that each brush can only come in contact with one bar at a time. When the rotor 1 has rotated through such an angle that the following pair of bars is in contact with the brushes 3 and 4 respectively, the capacitor side previously connected to the brush 4 is now connected to the brush 3, and vice versa, and the charge voltage of the capacitor is added to that of the electrical source, sending through the circuit of the relay 6 an impulse of energy. A succession of impulses provides the pulsating current.

The new elements illustrated in Fig. 1 are: on the one hand, the fact that the relay utilized is of the biased type; in the example illustrated, the relay armature carries a magnet 21 but without departing from the spirit and scope of the invention, this relay may also be of the biased-core type; and, on the other hand, the presence of an auxiliary winding 17 of same direction as the main winding 6, which is energized when the relay is closed by the battery voltage through the medium of a variable resistor 26.

The use of a biased relay increases its relay responsiveness. In fact, with the mounting already known, the responsiveness of the relay had to be relatively low to prevent it from being closed by the current flowing through the winding 16 in the absence of any current in the winding 6 (in the case of a stand-still vehicle). With the use of a biased relay, the latter may be highly sensitive since its function is limited to balancing the currents flowing through windings 6 and 16 without any risk of untimely closing of the relay armature for, provided that a suitable polarity is selected, the winding 16 alone will not be sufficient to cause the relay armature to close.

The presence of the additional auxiliary winding 17 increases the stability of the relay, that is, the ratio of the current actuating it to close contacts 7 and 8 to the current necessary to open same. In fact, from the very moment the relay is closed, the action of winding 17 is added to that of winding 6 and the relay armature cannot open unless the current flowing through winding 6 has dropped to a value considerably lower than that having caused the relay to close beforehand. The stability of operation is furthermore adjustable at will by means of the variable resistor 26.

Figure 2 illustrates a mounting very similar to the preceding one but wherein, to avoid the use of three windings in a same relay, the winding 17 is dispensed with and the stability of operation increased by controlling the current flowing through the winding 16. To this end, this winding 16 is fed through an additional resistor 18 in series with the aforesaid variable resistor 11 and the relay armature A is mechanically connected to a swing arm B provided with an additional set of contacts 19, 20 for short-circuiting or by-passing the additional resistor 18 when the relay is open and to re-insert it in the circuit when the relay is closed as a consequence of its energization. As a possible modification thereof and without departing from the spirit and scope of the invention, the contacts 19, 20 may be actuated by an auxiliary relay fed in parallel with the winding 9. The additional resistor 18 increases the stability of the relay while reducing the influence of winding 16. The stability of operation of the device may be adjusted at will by means of resistor 18.

Figure 3 illustrates another form of embodiment of this invention wherein the relay comprises only one main winding 6, its armature being provided, as in the preceding case, with an arm B carrying an additional set of contacts 19, 20 designed to provide an additional, adjustable degree of stability.

In this mounting the pulse current is fed from brush 4 to winding 6 through a diode 24 or a rectifier of any known and suitable type, preferably a crystal rectifier. A resistor 22, the diode 24 and winding 6 are connected in parallel with the circuit section comprising the device 1—3—4 for generating pulse current. The winding 6 is grounded through the variable resistor 11 introducing the engine load parameter, as already set forth, and a resistor 25 in series with resistor 11 for introducing the stability feature. A further resistor 23 is connected across the terminals of capacitor 12.

In this specific form of embodiment the voltage obtaining across the terminals of resistor 23 is substantially proportional to the velocity of the vehicle. Winding 6 in series with diode 24 will receive current and therefore the relay will be actuated only if the voltage available at brush 4 is higher than the voltage measured at the junction point of resistors 11 and 22. With this arrangement the use of a costly biased relay is avoided. The stability feature is obtained by short-circuiting through contacts 19, 20, when the relay is energized, the aforesaid resistor 25, the latter being variable to permit the stability adjustment as already set forth hereinabove. Of course, this stability adjustment may also be obtained by providing a separate winding as shown in Fig. 1.

As shown in Fig. 4, the invention is easily mounted in a vehicle. Thus the make-break switch is mounted adjacent the output shaft of the change-speed gear box 30 and the relay 6 and its associated capacitors are mounted in an enclosure 31 and the variable resistance 11 is in an enclosure 32. A link 33 connects the resistance 11 with the throttle control links 35 connected to the vehicle accelerator 37. The battery 5 is connected to the various elements, as shown, for operably controlling device 9 actuating the gear box 30.

I claim:

1. In combination with a power transmission system having an automatic change-speed gear box provided with means for changing gear ratios and a driven output shaft, an automatic control device responsive to the speed of rotation of said output shaft comprising, a source of direct current, first electro-responsive means for actuating said means for changing gear ratios, normally open electrical contacts between the source of direct current and the first electro-responsive means, a source of pulsating direct current operationally connected to said output shaft and adapted to produce pulsating direct current proportional to the speed of rotation of said shaft, second electro-responsive means for closing said normally open contacts at a selected value of pulsating direct current and holding said contacts closed until said current value falls to a lesser selected value than that selected for closing, whereby said first electro-responsive means are energized when said normally open contacts are closed and de-energized when said contacts are open.

2. An automatic control device as described in claim 1, characterized in that the second electro-responsive means comprises a relay having an armature carrying one of said normally open contacts and constituting with said other contact a single pole throw switch, a biasing spring attached to said armature for biasing it to an open contact position, a main coil directly energized by the pulsating direct current source for causing said armature to close said normally open contacts against said biasing spring, means for selecting the value of pulsating direct current to close said normally open contacts and means for selecting the value of said pulsating direct current to open said normally open contacts when they are closed whereby said first electro-responsive means are energized at a higher speed of rotation of said output shaft than the rate of speed at which said means are de-energized.

3. An automatic control device, in combination as described in claim 2 characterized in that the means for selecting a value of pulsating direct current to close said normally open contacts comprises an auxiliary coil electro-magnetically opposed to said main coil and energized by the direct current source, a variable resistor connected between said auxiliary opposing coil and said source of direct current, said variable resistor for adjusting the electro-magnetic opposition of the opposing auxiliary coil to the main coil and thus selecting the value of the pulsating direct current that energizes the main coil to operate the armature to close the normally open contacts whereby said first electro-responsive means are energized.

4. An automatic control device in combination as described in claim 2, characterized in that the means for selecting a value of pulsating direct current to open said normally open contacts when closed comprises a second auxiliary coil electro-magnetically augmenting said main coil and energized by said direct current source when said normally open contacts are closed, a second variable resistor connected between said second auxiliary augmenting coil and the direct current source at a point between said normally open contacts and said first electro-responsive means, said second variable resistor for adjusting the electromagnetic augmentation of the auxiliary augmenting coil to the main coil and thus selecting the value of the pulsating direct current at which the main coil de-energized to allow said biasing spring to operate said armature to open said contacts thereby de-energizing said first electro-responsive means.

5. In an automatic control device in combination as described in claim 2, a capacitor connected to the pulsating direct current source and in parallel with said main coil for smoothing said pulsating direct current.

6. In an automatic control device in combination as described in claim 2, characterized in that said armature mounts a permanent polarizing magnet for damping the movement of said armature in cooperation with said main coil and said biasing spring.

7. In an automatic control device in combination as described in claim 2 characterized in that means for selecting values of pulsating direct current to close and open said normally open contacts comprise an auxiliary coil wound to electro-magnetically oppose said main coil, two variable resistors connected in series between said auxiliary coil and the direct current source, normally closed auxiliary contacts mechanically connected to said normally open contacts and adapted to open when said normally open contacts close thus constituting a double pole single throw make and break switch, one said variable resistor for adjusting the initial magnetic opposition to said main coil and thus selecting the value of the pulsating direct current that energizes the main coil to operate the armature closing the normally open contacts and opening the normally closed auxiliary contacts, and the other said variable resistor being electrically connected to the auxiliary contacts which when closed shorts said variable resistor, said initially shorted variable resistor for adjusting the electro-magnetic opposition of said auxiliary coil to said main coil when said normally open contacts are closed thus selecting the value of pulsating direct current energizing the main coil at which the biasing spring operates the armature to open said normally open contacts and close said normally closed auxiliary contacts.

8. In an automatic control device in combination as described in claim 7 characterized in that a capacitor is connected to the pulsating direct current source and in parallel with said main coil for smoothing said pulsating direct current.

9. In an automatic control device in combination as described in claim 7, characterized in that said armature mounts a permanent pole rising magnet for damping the movements of said armature in cooperation with said main coil and said biasing spring.

10. In an automatic control device in combination as described in claim 2 characterized in that means for selecting values of pulsating direct current to close and open said normally open contacts comprise a rectifier connected between said pulsating direct current source and said main coil, two variable resistors connected in series with said main coil and ground and also connected in series with a resistor and said direct current source, normally open auxiliary contacts mechanically connected to said normally open contacts and both sets of said contacts adapted to open and close together, constituting a double pole single throw switch, said contacts electrically connected to short one said variable resistor when said auxiliary contacts are closed, one said variable resistor in series with the other for selecting the value of the pulsating direct current that causes the main coil to energize to operate the armature to close both said contacts, and the other said variable resistor that is shorted when said auxiliary contacts close for selecting the value of the pulsating direct current energizing the main coil at which the biasing spring operates the armature to open both said sets of contacts.

11. An automatic control device in combination as described in claim 8 characterized in that a capacitor bypassed by a resistor is connected to the pulsating direct current source and parallel with said rectifier and main coil for smoothing said pulsating direct current.

References Cited in the file of this patent

UNITED STATES PATENTS

| | | |
|---|---|---|
| 2,432,899 | Immel | Dec. 16, 1947 |
| 2,611,808 | Lawrence | Sept. 23, 1952 |
| 2,755,679 | Nallinger | July 24, 1956 |
| 2,855,794 | Faisandier | Oct. 14, 1958 |
| 2,891,411 | Sutherland et al. | June 23, 1959 |